(12) United States Patent
Khosrowpour et al.

(10) Patent No.: US 11,669,429 B2
(45) Date of Patent: Jun. 6, 2023

(54) CONFIGURATION CLUSTER-BASED PERFORMANCE OPTIMIZATION OF APPLICATIONS IN AN INFORMATION HANDLING SYSTEM (IHS)

(71) Applicant: Dell Products, L.P., Round Rock, TX (US)

(72) Inventors: Farzad Khosrowpour, Pflugerville, TX (US); Mitchell Anthony Markow, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 156 days.

(21) Appl. No.: 17/148,318

(22) Filed: Jan. 13, 2021

(65) Prior Publication Data

US 2022/0222163 A1 Jul. 14, 2022

(51) Int. Cl.
*G06F 11/34* (2006.01)
*G06F 11/30* (2006.01)
*G06N 20/00* (2019.01)

(52) U.S. Cl.
CPC ...... *G06F 11/3409* (2013.01); *G06F 11/3006* (2013.01); *G06F 11/3051* (2013.01); *G06N 20/00* (2019.01)

(58) Field of Classification Search
CPC ............ G06F 11/3409; G06F 11/3006; G06F 11/3051
See application file for complete search history.

(56) References Cited

U.S. PATENT DOCUMENTS

| | | | |
|---|---|---|---|
| 11,409,644 B2* | 8/2022 | Carames | G06F 8/61 |
| 2007/0162720 A1* | 7/2007 | Branda | G06F 9/5077 |
| | | | 711/173 |
| 2021/0263749 A1* | 8/2021 | Laskawiec | G06F 9/44505 |

* cited by examiner

*Primary Examiner* — Manuel L Barbee
(74) *Attorney, Agent, or Firm* — Fogarty LLP (57) ABSTRACT

Embodiments of systems and methods for managing performance optimization of a target application executed by an Information Handling System (IHS) are described. In an illustrative, non-limiting embodiment, an IHS may includes executable code to measure a performance of a target application at each of multiple configuration clusters that are applied to an IHS in which each configuration cluster includes multiple configuration settings of one or more resources that are used to execute the target application on the IHS. Using the measured performance values, the instructions may then select one of the configuration clusters that causes the target application to operate at an optimum performance level, and modify the IHS to operate with the one selected configuration cluster.

18 Claims, 6 Drawing Sheets

300

| | | CLUSTER 1 - WORKLOAD 1 = f(CPU, GPU, STORAGE, NET) | | | | ○○○ | CLUSTER M - WORKLOAD M = f(CPU, GPU, STORAGE, NET) | | | |
|---|---|---|---|---|---|---|---|---|---|---|
| PERF MODE | BATT MODE | CPU KNOBS | GPU KNOBS | STORAGE KNOBS | NETWORK KNOBS | 216 | CPU KNOBS | GPU KNOBS | STORAGE KNOBS | NETWORK KNOBS |
| PERFORMANCE | BATT MODE a | PLX a1 | CLK/FPS a1 | ROS a1 | TBD a1 | | PLX aM | CLK/FPS aM | ROS aM | TBD aM |
| | BATT MODE b | PLX b1 | CLK/FPS b1 | ROS b1 | TBD b1 | | PLX bM | CLK/FPS bM | ROS bM | TBD bM |
| | BATT MODE N | PLX N1 | CLK/FPS N1 | ROS N1 | TBD N1 | | PLX NM | CLK/FPS NM | ROS NM | TBD NM |
| POWER SAVING | BATT MODE x | PLX x1 | CLK/FPS x1 | ROS x1 | TBD x1 | | PLX xM | CLK/FPS xM | ROS xM | TBD xM |
| | BATT MODE y | PLX y1 | CLK/FPS y1 | ROS y1 | TBD y1 | | PLX yM | CLK/FPS yM | ROS yM | TBD yM |
| | BATT MODE Z | PLX Z1 | CLK/FPS Z1 | ROS Z1 | TBD Z1 | | PLX ZM | CLK/FPS ZM | ROS ZM | TBD ZM |

| PERF MODE | BATT MODE | CLUSTER 1 - WORKLOAD 1 = f(CPU, GPU, STORAGE, NET) | | | | | CLUSTER M - WORKLOAD M = f(CPU, GPU, STORAGE, NET) | | | |
|---|---|---|---|---|---|---|---|---|---|---|
| | | CPU KNOBS | GPU KNOBS | STORAGE KNOBS | NETWORK KNOBS | ○ ○ ○ | CPU KNOBS | GPU KNOBS | STORAGE KNOBS | NETWORK KNOBS |
| PERFORMANCE | BATT MODE a | PLX a1 | CLK/FPS a1 | ROS a1 | TBD a1 | | PLX aM | CLK/FPS aM | ROS aM | TBD aM |
| | BATT MODE b | PLX b1 | CLK/FPS b1 | ROS b1 | TBD b1 | | PLX bM | CLK/FPS bM | ROS bM | TBD bM |
| | BATT MODE N | PLX N1 | CLK/FPS N1 | ROS N1 | TBD N1 | | PLX NM | CLK/FPS NM | ROS NM | TBD NM |
| POWER SAVING | BATT MODE x | PLX x1 | CLK/FPS x1 | ROS x1 | TBD x1 | | PLX xM | CLK/FPS xM | ROS xM | TBD xM |
| | BATT MODE y | PLX y1 | CLK/FPS y1 | ROS y1 | TBD y1 | | PLX yM | CLK/FPS yM | ROS yM | TBD yM |
| | BATT MODE Z | PLX Z1 | CLK/FPS Z1 | ROS Z1 | TBD Z1 | | PLX ZM | CLK/FPS ZM | ROS ZM | TBD ZM |

CONFIGURATION CLUSTER-BASED PERFORMANCE OPTIMIZATION OF APPLICATIONS IN AN INFORMATION HANDLING SYSTEM (IHS)

FIELD

The present disclosure relates generally to Information Handling Systems (IHSs), and more particularly, to a configuration cluster-based performance optimization of applications in an information handling system (IHS).

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs typically include various resources, such as central processing units (CPUs), graphics processing units (GPUs), storage (e.g., hard disk drives, random access memory (RAM), etc.), network resources, and platform resources (power supplies, cooling systems, batteries, etc.) that it uses to perform its various services. In many cases, these resources are provided with machine learning (ML) optimization schemes to enhance their performance. As the inventors hereof have recognized, however, many ML optimization schemes are performed without regard for each others actions. Moreover, each of the many resources of the IHS often possess numerous configuration settings that can affect not only the performance of its operation, but also the performance of other resources in the IHS. Thus, coordinating ML optimization on a system-wide basis, in many cases, can be an unwieldy task. It is with these problems in mind, among others, that embodiments of the present disclosure are described herein.

SUMMARY

Embodiments of systems and methods for managing performance optimization of a target application executed by an Information Handling System (IHS) are described. In an illustrative, non-limiting embodiment, an IHS may includes executable code to measure a performance of a target application at each of multiple configuration clusters that are applied to an IHS in which each configuration cluster includes multiple configuration settings of one or more resources that are used to execute the target application on the IHS. Using the measured performance values, the instructions may then select one of the configuration clusters that causes the target application to operate at an optimum performance level, and modify the IHS to operate with the one selected configuration cluster.

According to another embodiment, a method includes the steps of measuring a performance of a target application at each of multiple configuration clusters that are applied to an IHS, selecting one of the configuration clusters that causes the target application to operate at an optimum performance level, and modifying the IHS to operate with the one selected configuration cluster. Each configuration cluster includes multiple configuration settings of one or more resources that are used to execute the target application on the IHS.

According to yet another embodiment, a memory storage device includes executable code to measure a performance of a target application at each of multiple configuration clusters that are applied to an IHS in which each configuration cluster includes multiple configuration settings of one or more resources that are used to execute the target application on the IHS. Using the measured performance values, the instructions may then select one of the configuration clusters that causes the target application to operate at an optimum performance level, and modify the IHS to operate with the one selected configuration cluster.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of the present disclosure provide a system and method for configuration cluster-based performance optimization of applications in an information handling system (IHS) that measures a performance of a target application at each of multiple configuration clusters that are applied to an IHS, and selects one of the configuration clusters that causes the target application to operate at an optimum performance level. Each configuration cluster includes multiple configuration settings of the resources used to execute the target application on the IHS. This operation can be coupled with a machine learning (ML) algorithm that learns the IHS at each of multiple configuration clusters to fine tune (e.g., tweak) certain configuration settings in order to obtain optimal performance for the target application. The fine tuned configuration settings of the configuration cluster can then be stored and used in the future for further performance optimization of the target application on the IHS.

As described previously, IHSs typically include various resources, such as central processing units (CPUs), graphics processing units (GPUs), storage (e.g., hard disk drives, random access memory (RAM), etc.), and platform resources (power supplies, cooling systems, batteries, etc.) that it uses to perform its various services. In many cases, these resources are provided with certain optimization schemes to enhance their performance. However, many optimization schemes are performed without regard for each others actions. For example, a CPU resource and a GPU resource normally share thermal and power systems in IHSs, such as laptop computers. The current power sharing and balancing is often based on hardware power (e.g., HWP) settings and frequency balancing between those resources, such as found in INTEL ARCHITECTURE (IA) and GFX subsystems. This can pose a challenge in tuning performance of target applications that dominantly use CPU resources or GPU resources when there is a significant concurrency of resource usage by other (non-target) applications. Each resource may optimize its resources based on its own workload, but not based on target applications or other configurations of the IHS that may impact user experience. Additionally, since CPU resource performance in many small laptops is limited according to its thermal design point (TDP), configuration changes, such as docking of the IHS on a docking station, which results in additional connected peripherals (e.g., external monitors) often yields additional heat, which can cause the performance to degrade despite the fact that the laptop is running on AC power.

Embodiments of the present disclosure provide a solution to this problem, among other problems, by enabling system-wide optimization of an IHS using configuration clusters that simplify the myriad of configuration settings that are often used to optimize performance of the resources of an IHS. Each of the resources of the IRS often possesses numerous configuration settings that can affect not only the performance of its operation, but also the performance of other resources in the IHS. Thus, coordinating ML optimization on a system-wide basis, in man cases, can be an unwieldy task due to the large quantity of configuration settings that are, in many cases, interdependent upon one another, Thus, by categorizing groups of configuration settings in clusters, optimization may be simplified and meaningful performance enhancing results obtained in a relatively shorter period of time in some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
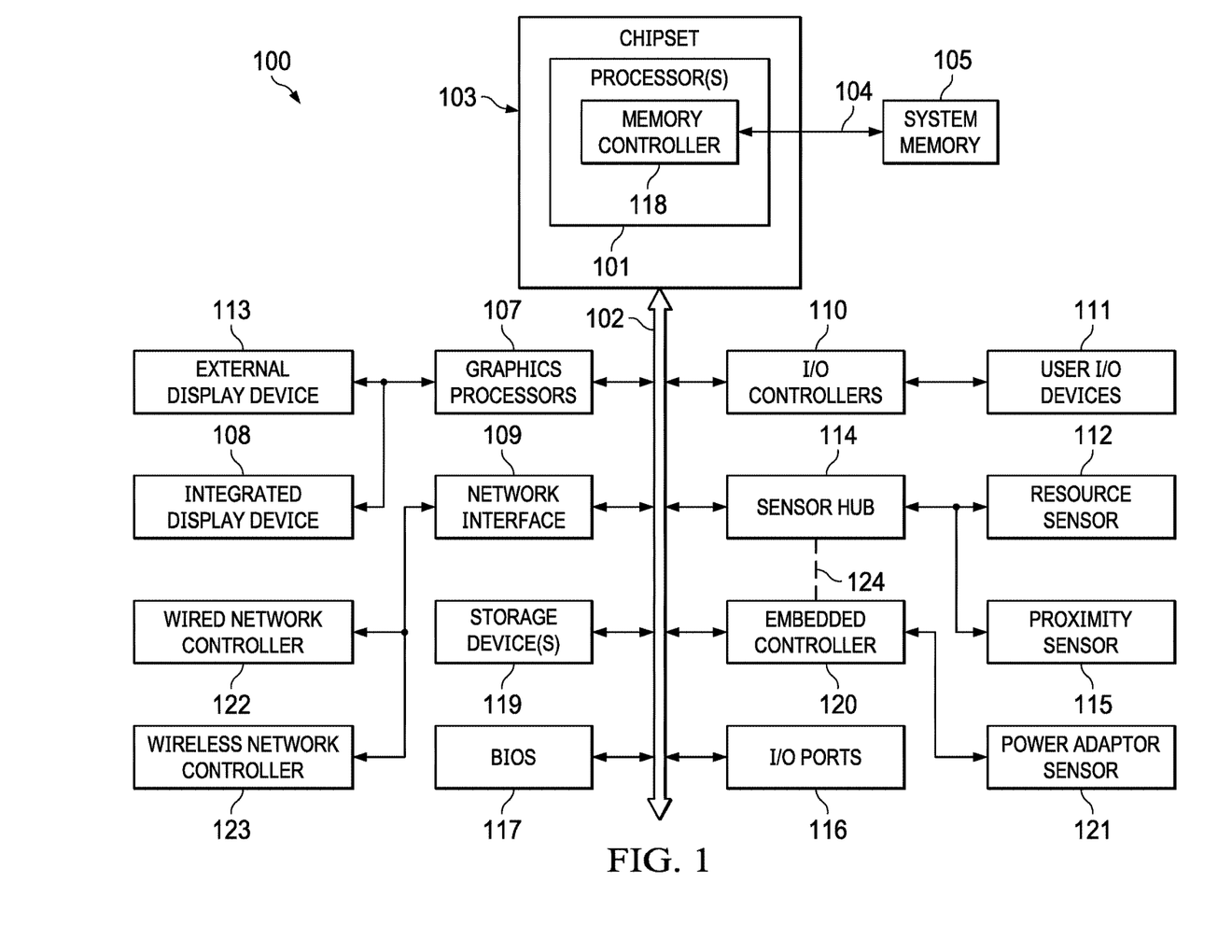
FIG. 1 is a block diagram an example of an Information Handling System (IHS) configured to manage performance optimization of applications, according to one embodiment of the present disclosure.

FIG. 1 is a block diagram illustrating components of IHS 100 configured to manage performance optimization of applications. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O ports 116 may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 111 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to the processor(s) 101 of the IHS 100 through the chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and 113, coupled to IHS 100.

One or more display devices 108 and 113 coupled to IHS 100 may utilize LCD, LED, OLED, or other display technologies. Each display device 108 and 113 may be capable of receiving touch inputs such as via a touch controller that may be an embedded component of the display device 108 and 113 or graphics processor 107, or it may be a separate component of IHS 100 accessed via bus 102. In some cases, power to graphics processor 107, integrated display device 108 and/or external display device 113 may be turned off, or configured to operate at minimal power levels, in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external display devices 113, such as external monitors that may be coupled to IHS 100 via various types of couplings, such as by connecting a cable from the external display device 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of sensors. For instance, sensor hub 114 may utilize hardware resource sensor(s) 112, which may include electrical current or voltage sensors, and that are capable of determining the power consumption of various components of IHS 100 (e.g., CPU 101, GPU 107, system memory 105, etc.). In certain embodiments, sensor hub 114 may also include capabilities for determining a location and movement of IHS 100 based on triangulation of network signal information and/or based on information accessible via the OS or a location subsystem, such as a GPS module.

In some embodiments, sensor hub 114 may support proximity sensor(s) 115, including optical, infrared, and/or sonar sensors, which may be configured to provide an indication of a user's presence near IHS 100, absence from IHS 100, and/or distance from IHS 100 (e.g., near-field, mid-field, or far-field).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

EC 120 may also implement operations for interfacing with power adapter sensor 121 in managing power for IHS 100. These operations may be utilized to determine the power status of IHS 100, such as whether IHS 100 is operating from battery power or is plugged into an AC power source (e.g., whether the IHS is operating in AC-only mode, DC-only mode, or AC+DC mode). In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
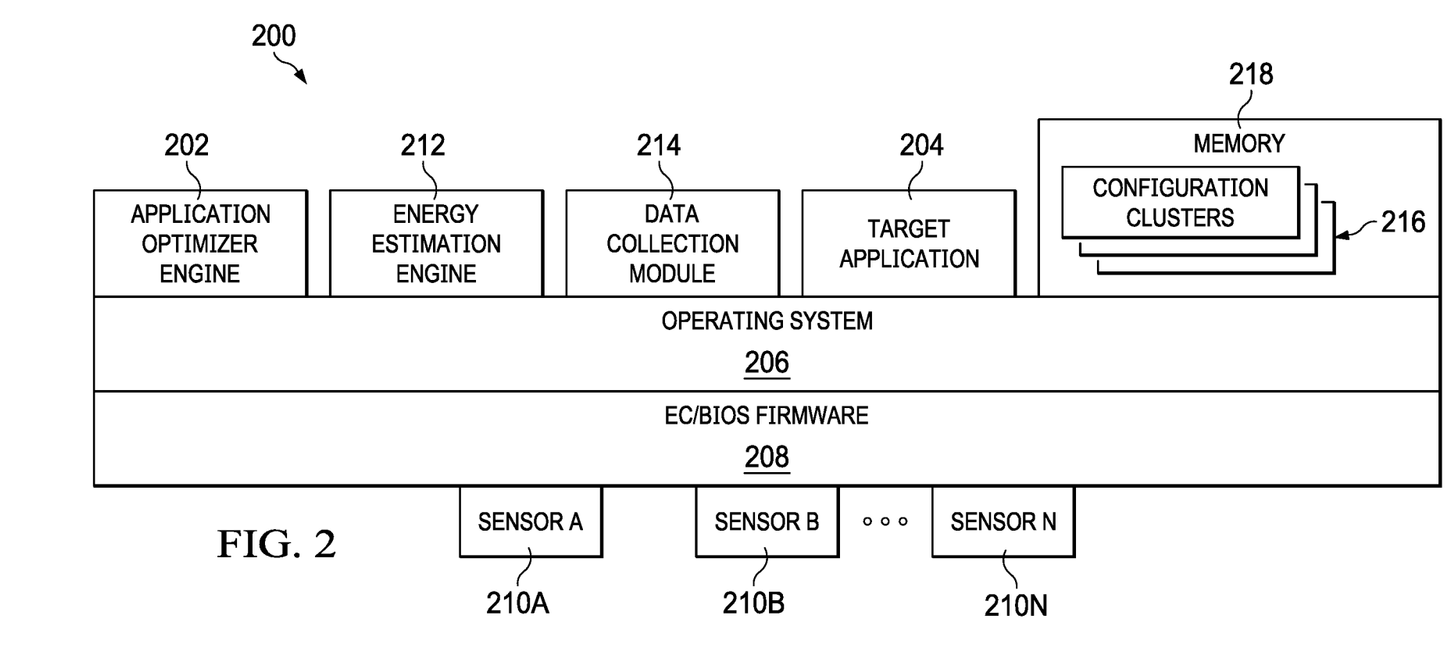
FIG. 2 is a block diagram illustrating an example of a software system produced by the IHS for managing the performance optimization of applications.

FIG. 2 is a block diagram illustrating an example of software system 200 produced by IHS 100 for managing the performance optimization of applications. In some embodiments, each element of software system 200 may be provided by IHS 100 through the execution of program instructions by one or more logic components (e.g., CPU 101, BIOS 117, EC 120, etc.) stored in memory (e.g., system memory 105), storage device(s) 119, and/or firmware.

As shown, software system 200 includes application optimizer engine 202 configured to optimize the performance of a target application 204. One example application optimizer engine 202 may include the DELL PRECISION OPTIMIZER. Meanwhile, examples of target applications 204 that may be optimized by engine 202 may include, but not limited to, computing resource-intensive applications such as ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both application optimizer engine 202 and target application 204 are executed by OS 206, which is turn supported by EC/BIOS/firmware 208. EC/BIOS firmware 208 is in communications with, and configured to receive data collected by, sensor modules or drivers 210A-N—which may abstract and/or interface with hardware resource sensor 112, proximity sensor 115, and power adapter sensor 121, for example.

In various embodiments, software system 200 also includes, energy estimation engine 212, and data collection module 214 executed above OS 206.

Energy estimation engine 212 may include, for example, the MICROSOFT E3 engine, which is configured to provide energy usage data broken down by applications, services, tasks, and/or hardware in an IHS. In some cases, energy estimation engine 212 may use software and/or hardware sensors configured to determine, for example, whether target application 204 is being executed in the foreground or in the background (e.g., minimized, hidden, etc.) of the IHS's graphical user interface (GUI).

Data collection module 214 may include any data collection service or process, such as, for example, the DELL DATA VAULT configured as a part of the DELL SUPPORT CENTER that collects information on system health, performance, and environment. In some cases, data collection module 214 may receive and maintain a database or table that includes information related to IHS hardware utilization (e.g., by application, by thread, by hardware resource, etc.), power source (e.g., AC-plus-DC, AC-only, or DC-only), etc.

In operation, application optimizer engine 202 performs a machine learning (ML) process to derive certain application performance features associated with target application 204 executed by IHS 100. Target application 204 may be any type for which optimization of its performance is desired. In one embodiment, IHS 100 may include a user-editable list, such as one included in a configuration file of application optimizer engine 202, of multiple target applications 204 whose performance is to be optimized by application optimizer engine 202. In another embodiment, application optimizer engine 202, or other process included in system 200, may include executable code for providing a ML process to derive which applications are to be optimized.

Application optimizer engine 202 monitors data associated with the operation of target application 204 to characterize its resource utilization. For example, application optimizer engine 202 may obtain telemetry data from energy estimation engine 212, data collection module 214, and/or directly from sensors $210_A$-$210_N$ configured in IHS 100 to determine one or more performance features associated with target application 204. Once application optimizer engine 202 has collected characteristics over a period of time, it may then process the collected data using statistical descriptors to extract the application performance features of target application 204. For example, application optimizer engine 202 may monitor target application 204 over time to estimate its resource usage with respect to various aspects, such as which actions performed by target application 204 cause certain resources to encounter loading, events occurring on IHS 100 that causes target application 204 to require a relatively high level of resource usage, and a time period of day in which these actions are encountered. Once application optimizer engine 202 has collected characteristics over a period of time, it may then process the collected data using statistical descriptors to extract the application performance features associated with target application 204.

Application optimizer engine 202 may use any suitable ML-based algorithm such as, for example, a Bayesian algorithm, a Linear Regression algorithm, a Decision Tree algorithm, a Random Forest algorithm, a Neural Network algorithm, or the like. Application optimizer engine 202 evaluates the performance features of target application 204 against a trained ML model to obtain a profile recommendation. Using the profile recommendation, application optimizer engine 202 adjusts (e.g., adapts) the resources to optimize the performance of target application 204.

According to one embodiment of the present disclosure, application optimization engine 202 applies a multiple step process in which a group of configuration clusters 216 are applied to the resources (e.g., CPU resources, GPU resources, storage resources, platform resources, etc.) of IHS 100 to identify a particular configuration cluster 216 that optimally enhances the performance of target application 204 on IHS 100. Once a particular configuration cluster 216 has been identified, application optimization engine 202 may continue to perform ML of IHS 100 to tweak or otherwise fine tune certain configuration settings of the identified configuration cluster 216 to further optimize performance of target application 204. The fine tuned configuration cluster 216 may then be stored in memory 218 and accessed in the future to further optimize the performance of target application 204 when it is to be used in the future. Memory 218 may include, for example, system memory 105 as described herein above.

Each configuration cluster 216 includes multiple configuration settings of the resources used to execute the target application on the IHS. The configuration settings generally refer to characteristics (e.g., parameters) that may be modified to yield varying performance levels of its associated resource. For example, one or more of the configuration settings in a configuration cluster 216 may be associated with the CPU resources in IHS 100, such as a power level (PL) applied to the CPU, overclocking/underclocking of CPU, cache level within CPU, and the like. GPU resources, likewise, may have configuration settings that may be included in a configuration cluster 216, such as a frame rate, often rated in frames per second (FPS), a refresh rate, or a computational frame rate of the GPU. The frame rate generally refers to how many images are stored or generated every second by the GPU resource. The refresh rate (vertical scan rate), on the other hand, refers to the number of times per second that the GPU resource displays a new image. The computational frame rate generally refers to a ratio of sequential images of a video image that are computationally processed by the GPU resource. Storage resources, for example, may include configuration settings, such as write optimized settings or read optimized settings, queue depth, block size, and the like. Network resources may include configuration settings, such as buffer size, communication protocol settings, and so on. Each configuration cluster 216 may include configuration settings that are only associated with a single type of resource, or it may include configuration settings associated multiple resources, or all resources of IHS 100.

Figure 3:
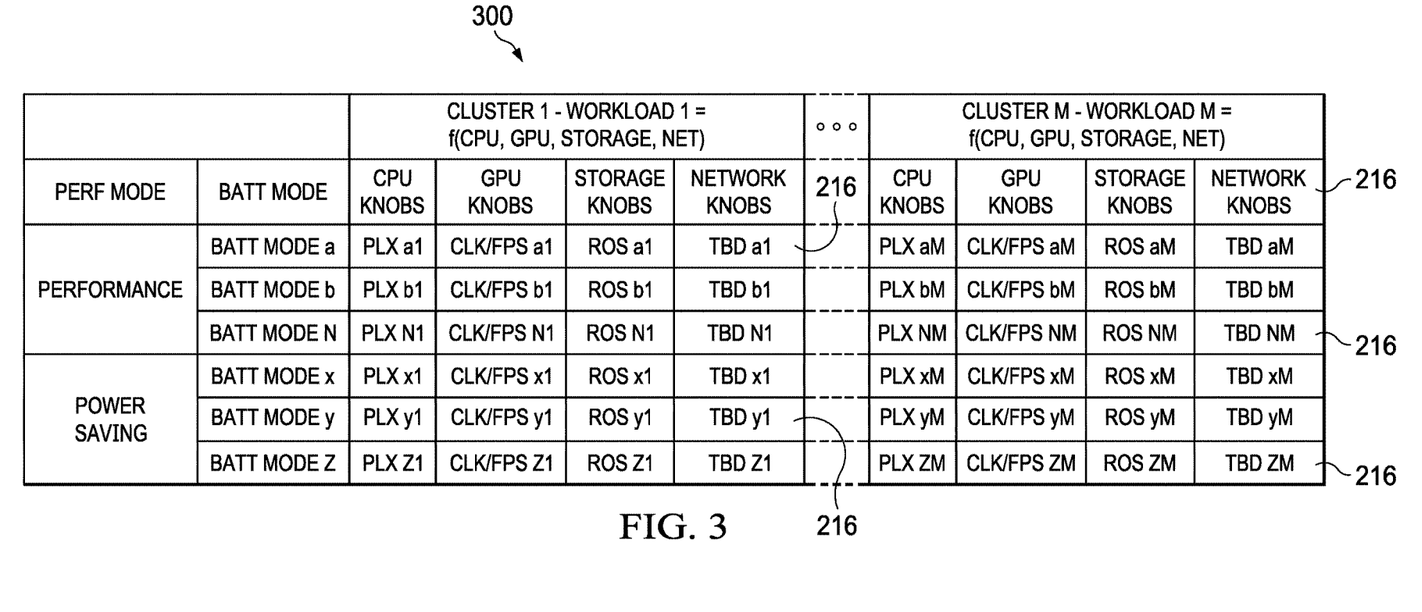
FIG. 3 depicts an example table showing several configuration clusters that may be used by the application optimization engine to optimize performance of a target application according to one embodiment of the present disclosure.

FIG. 3 depicts a table 300 showing several configuration clusters 216 that may be used by application optimization engine 202 to optimize performance of a target application 204 according to one embodiment of the present disclosure. As shown, a total of twelve configuration clusters 216 are shown in which six are categorized as being associated with a performance mode of IHS 100, while another six of the configuration clusters 216 are categorized as being associated with a power saving mode of IHS 100. The configuration clusters 216 may be further categorized according to a battery mode of operation. For example, as shown, two of the configuration clusters 216 shown are each associated with six different battery operating modes (e.g., a, b, N, x, y, Z).

Each configuration cluster 216 includes configuration settings (e.g., knobs) associated with CPU, GPU, storage, and network resources. In other embodiments, each configuration cluster may include settings associated with other resources, such as power system resources (e.g., power supply, battery, charging circuit, etc.), and cooling system resources. For example, the configuration clusters 216 associated with the performance mode and battery mode 'a' each includes a certain power level setting for the CPU, a clock rate and frame per second rate for the GPU, a read/write ratio setting for the storage resource, and a certain buffer size for the network resource. Configuration settings other than what are shown may exist.

Figure 4:
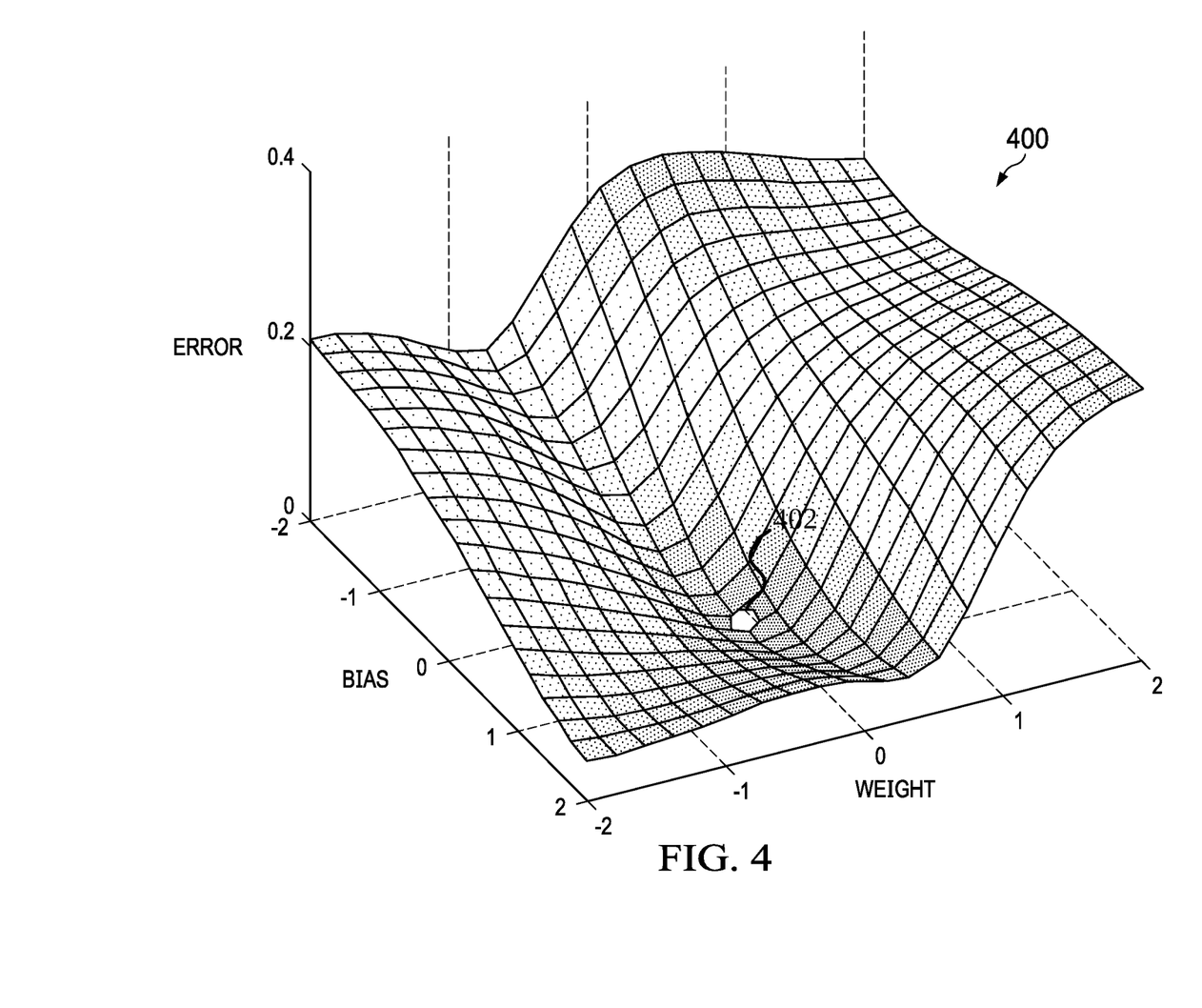
FIG. 4 illustrates an example three-dimensional plot showing how the performance of the target application may be optimized by an application optimizer engine according to one embodiment of the present disclosure.

FIG. 4 illustrates an example three-dimensional plot 400 showing how the performance of the target application 204 may be optimized by application optimization engine 202 according to one embodiment of the present disclosure. An error level of the optimization process is shown along the vertical axis of plot 400, while two separate configuration settings are each shown along the other axes. Only two configuration settings are shown for purposes of brevity and clarity of disclosure, and it should be understood that the optimization process performed by application optimization engine 202 may optimize target application 204 using a configuration cluster 216 having more than two configuration settings, such as using six, seven, eight, nine, or more than nine configuration settings. That is, the clusters may be comprised of any size (plurality) of N-to-M values and do not need to be a fixed number of clusters. Additionally, the boundaries between these clusters can dynamically change depending on the system configuration.

In general, plot 400 pictorially shows how application optimization engine 202 may iteratively reduce error via each iteration of different configuration clusters 216 applied to IHS 100. For example, after having applied a first configuration cluster 216 to IHS 100, application optimization engine 202 may perform a first learning window in which it is determined that the error is a certain level (e.g., 5 percent). Based on this assessment, application optimization engine 202 may select a second configuration cluster 216 to be applied to IHS 100, such that when a second learning window is performed, the error has been reduced (e.g., 2 percent). This process may continue N number of times until the error achieves a relative minimum value 402 as shown. Thus, application optimization engine 202 may, using multiple configuration clusters 216, iteratively optimize performance of target application 204 on IHS 100. Application optimization engine 202 may base its assessment in any suitable manner. In one embodiment, application optimization engine 202 may base its assessment by interpolating or extrapolating the results of two or more previous configuration clusters 216 that are applied to IHS 100. In another embodiment, application optimization engine 202 may successively apply multiple configuration clusters 216 without regard to how target application 204 performed when subjected to previous configuration clusters 216, such as one that would form a scatter plot. In such a case, after applying several configuration clusters 216 to IHS 100, application optimization engine 202 may select the configuration cluster 216 resulting in the lowest optimization error.

Figure 5A:
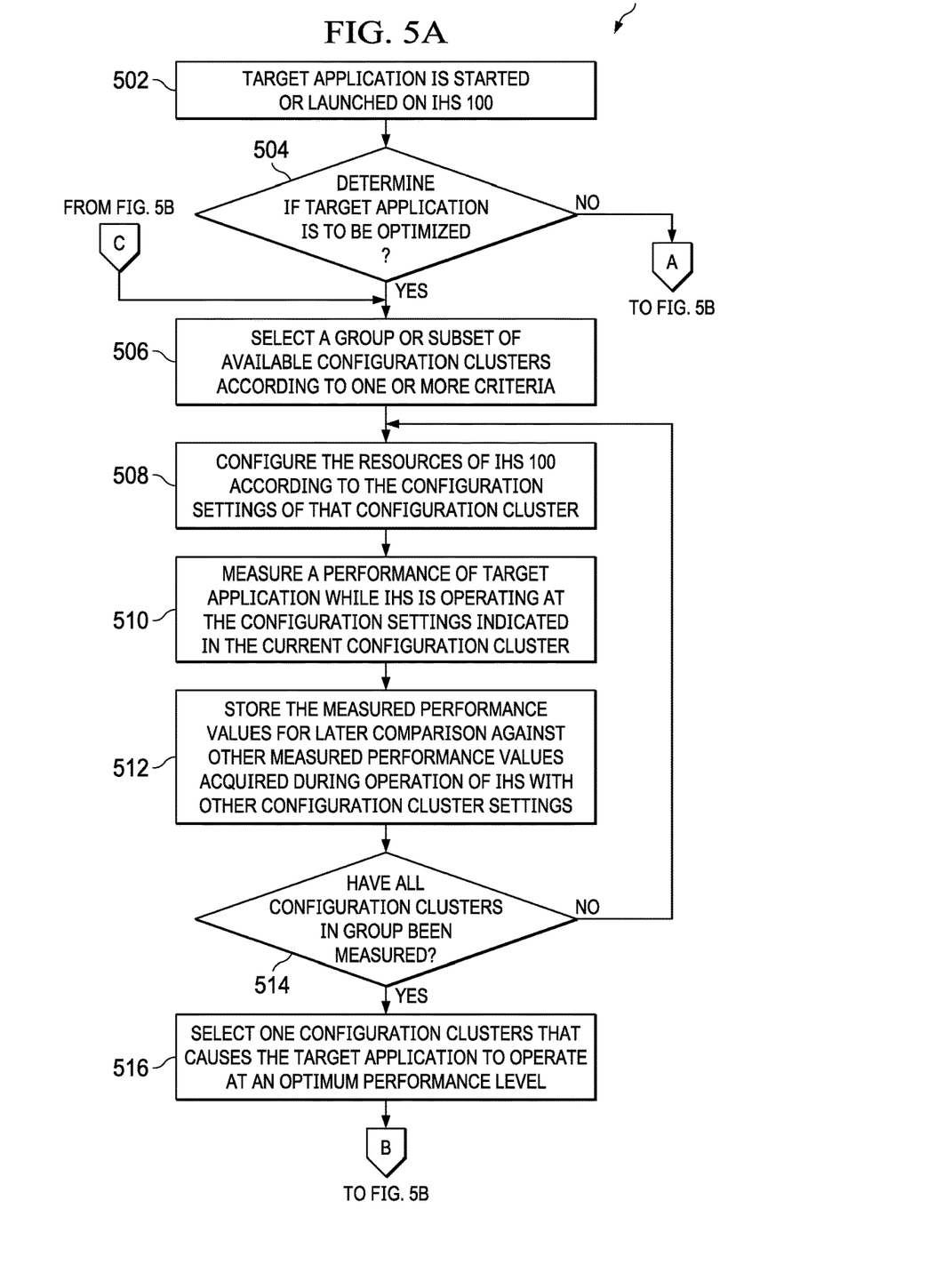
FIGS. 5A and 5B illustrate a flowchart illustrating an example method for optimizing a target application according to one embodiment of the present disclosure.
Figure 5B:
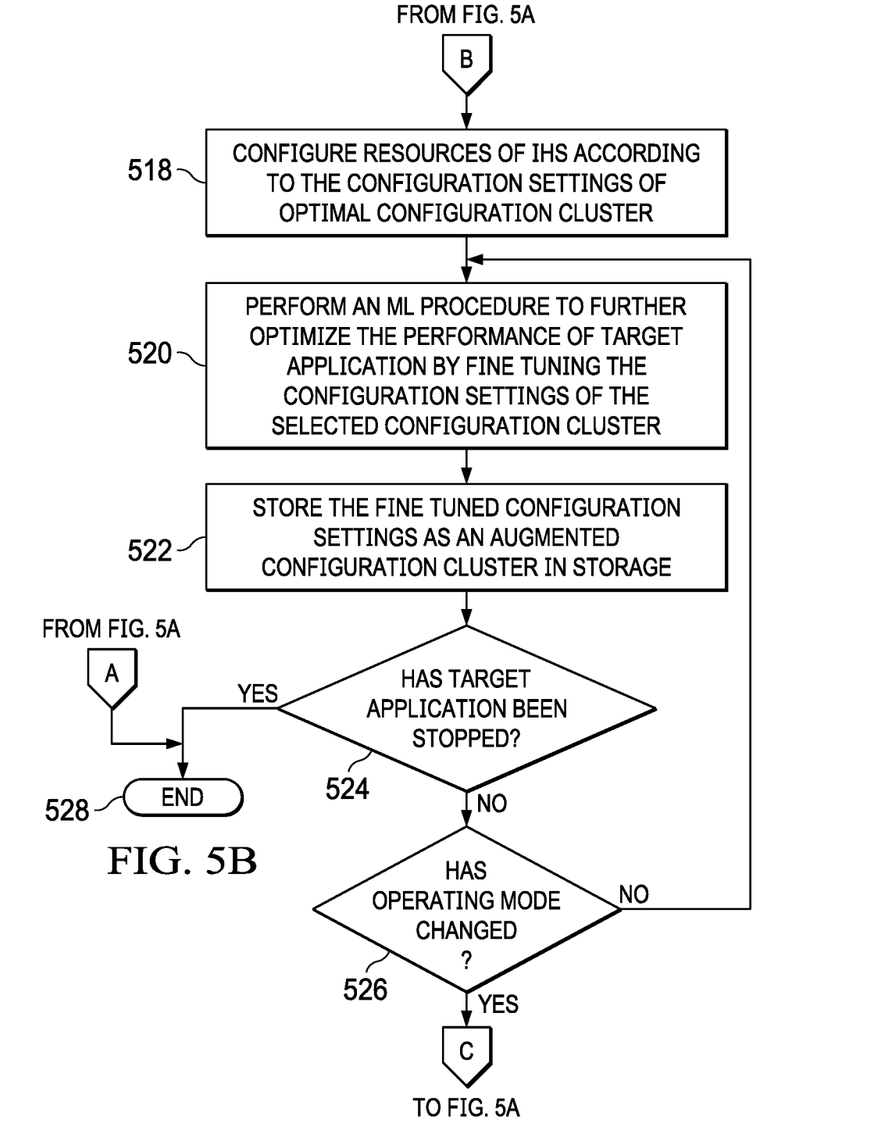

FIG. 5 illustrates an example method 500 that may be performed by application optimization engine 202 for optimizing performance of a target application 204 using multiple configuration clusters 216 according to one embodiment of the present disclosure. In some embodiments, method 500 may be executed, at least in part, by application optimization engine 202. At step 502, an application is started or launched on IHS 100. Thereafter, application optimization engine 202 determines whether the application is a target application 204 to be optimized at step 504. If not, the process ends at step 528; otherwise, processing continues at step 506. Application optimization engine 202 may verify that target application 204 is one to be optimized, for example, by accessing a user-editable file that includes a list of those target applications that are to be optimized by application optimization engine 202 as described herein above.

At step 506, application optimization engine 202 selects a group or subset of available configuration clusters 216 according to one or more criteria. For example, application optimization engine 202 may select a group of configuration clusters 216 according to a performance mode and/or a battery mode that IHS 100 is currently operating in. For another example, application optimization engine 202 may select a group of clusters 216 according to a type of target application 204 being executed. Furthering this example, application optimization engine 202 may include executable logic to detect that target application 204 is a graphics oriented type application that also requires significant storage resources at various times during its usage, and selects a group of configuration clusters 216 that are estimated to provide relatively good graphics and/or storage optimization. For yet another example, application optimization engine 202 may select a group of configuration clusters 216 according to a specific identity of the target application 204 for which optimization has been performed during a previous use of that target application 204. For yet another example, application optimization engine 202 may select a specific augmented configuration cluster according to a specific identity of the target application 204 for which optimization has been performed during a previous use of that target application 204 as will be described in detail with reference to step 522.

At step 508, application optimization engine 202 selects one configuration cluster 216 and configures the resources of IHS 100 according to the configuration settings of that configuration cluster 216. For example, if one configuration setting indicates that the FPS rate of the GPU resource should be set to 30 FPS, application optimization engine 202 may communicate with the GPU resource to set its frame rate to be 30 FPS. Application optimization engine 202 may perform similar actions for other configuration settings in the configuration cluster 216.

At step 510, application optimization engine 202 measures a performance of target application 204 while IHS 100 is operating at the configuration settings indicated in the current configuration cluster 216. In one embodiment, application optimization engine 202 may measure the performance by performing a ML procedure in which telemetry data, which is acquired using the ML procedure, may provide a relatively good estimation of measured performance. In another embodiment, application optimization engine 202 may tweak or fine tune one or more of the configuration settings as a result of the ML procedure so that the measured performance may be at least partially optimized. Thereafter at step 512, application optimization engine 202 stores the measured performance values for later comparison against other measured performance values acquired during operation of IHS 100 with other configuration cluster settings.

At step 514, application optimization engine 202 determines whether all configuration clusters 216 in the group of configuration clusters 216 have been measured. If so, processing continues at step 516; otherwise, processing continues at step 508 to measure the performance of target application 204 under different configuration cluster settings.

At step 516, application optimization engine 202 selects one of the configuration clusters that causes the target application to operate at an optimum performance level. That is, application optimization engine 202 selects the one configuration cluster 216 that causes target application 204 to function with the best performance. Application optimization engine 202 then configures the resources of IHS 100 according to the configuration settings of that configuration cluster 216 at step 518, and begins an ML procedure to further optimize the performance of target application 204 by tweaking the configuration settings of the selected configuration cluster 216 at step 520. At step 522, application optimization engine 202 stores the fine tuned configuration settings along with original configuration settings of the configuration cluster 216 as an augmented configuration cluster 216 in storage (e.g., memory 218) for use at a later time, such as at step 506 where application optimization engine 202 may begin another optimization procedure when the target application 204 is again started (e.g., launched) sometime in the future.

At step 524, application optimization engine 202 determines whether target application 204 has been stopped, that is, no longer being executed on IHS 100. If so, processing continues at step 528 in which method ends. However, if target application 204 is still being executed on IHS 100, processing continues at step 526.

At step 526, application optimization engine 202 determines whether an operating mode of target application 204 has changed. For example, a user who is initially using a 3-D computer aided design (CAD) application to generate a drawing may cause the CAD application to consume a relatively large level of GPU resources. Later on, however, the user may perform one or more storage operations, such as storing the newly created drawing, or combining the newly create drawing with other files stored in the system, such that the CAD application begins to consume a relatively large amount of storage resources. Application optimization engine 202, during its ongoing ML procedure, detects this change in operating mode, and causes the steps 506 through 520 to be performed again to optimize performance of the CAD application under its new operating mode. Therefore at step 526, if application optimization engine 202 detects that the operating mode of target application 204 has changed, processing continues at step 506 to process another group of configuration clusters 216; otherwise, processing continues at step 520 where application optimization engine 202 continues to optimize performance of target application 204 at its current operating mode.

As may be determined from the foregoing description of method 500, application optimization engine 202 may optimize and store multiple configuration clusters 216 for each target application 204 that it optimizes. For example, method 500 may store a first augmented configuration cluster 216 that is associated with a particular target application 204 when it is operating in a CPU resource intensive mode, a second augmented configuration cluster 216 when it is operating in a GPU resource intensive mode, and a third augmented configuration cluster 216 when it is operating in a storage intensive mode.

Although FIG. 5 describes one example of a method 500 that may be performed to enhance a performance level of a target application, the features of the disclosed process may be embodied in other specific forms without deviating from the spirit and scope of the present disclosure.

For example, the disclosed steps of method 500 may be performed in the sequence shown, or they may be performed in a different sequence other than what is specifically described herein. As another example, the method 500 may perform additional, fewer, or different operations than those operations as described in the present example. As yet another example, the steps of the process described herein may be performed by a computing system other than IHS 100, such as by an embedded controller, such as EC (BIOS) FIRMWARE 208 as described above with reference to FIG. 2, or by a cloud application that IHS 100 accesses from a publicly available network, such as the Internet.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
identify an operating mode at which a user is using a target application;
select a subset from among a plurality of configuration clusters according to the identified operating mode of the target application;
measure a performance of the target application at each of the subset of configuration clusters that are applied to an IHS, each configuration cluster comprising a plurality of configuration settings of one or more resources that are used to execute the target application on the IHS;
select one of the configuration clusters that causes the target application to operate at an optimum performance level;
modify the IHS to operate with the one selected configuration cluster.

2. The IHS of claim 1, wherein the instructions are further executed to:
detect that an operating mode of the target application has changed; and
perform the steps of measuring a performance of the target application, selecting the one configuration cluster, and modifying the IHS using another plurality of configuration clusters,
wherein the other plurality of configuration clusters are selected according to the detected operating mode.

3. The IHS of claim 1, wherein the instructions are further executed to perform a machine learning (ML) process to optimize a performance of the target application by fine tuning one or more of the configuration settings of the selected configuration cluster.

4. The IHS of claim 3, wherein the instructions are further executed to:
store the one or more fine tuned configuration settings as an augmented configuration cluster in the memory,
wherein the augmented configuration cluster is associated with the target application and an identified operating mode of the target application so that, when the target application is again started on the IHS at a future time, the instructions are further executed to select the augmented configuration cluster from the memory for optimizing the performance of the target application at its current operating mode.

5. The IHS of claim 1, wherein the instructions are further executed to select the plurality of configuration clusters as a subset of a plurality of available configuration clusters according to at least one of a current performance mode of the IHS or a battery operating mode of the IHS.

6. The IHS of claim 1, wherein the instructions are further executed to select the plurality of configuration clusters as a subset of a plurality of available configuration clusters according to a type of the target application currently being executed on the IHS.

7. The IHS of claim 1, wherein the one or more resources comprises at least one of a central processing unit (CPU) resource, a graphics processing unit (GPU) resource, a storage resource, a network resource, and a platform resource.

8. A method comprising:
identifying, using instructions stored in at least one memory and executed by at least one processor, an operating mode at which a user is using a target application;
selecting, using the instructions, a subset from among a plurality of configuration clusters according to the identified operating mode of the target application;
measuring, using the instructions, a performance of the target application at each of a plurality of configuration clusters that are applied to an IHS, each configuration cluster comprising a plurality of configuration settings of one or more resources that are used to execute the target application on the IHS;
selecting, using the instructions, one of the configuration clusters that causes the target application to operate at an optimum performance level; and
modifying, using the instructions, the IHS to operate with the one selected configuration cluster.

9. The method of claim 8, further comprising:
detecting that an operating mode of the target application has changed;
selecting the other plurality of configuration clusters according to the detected operating mode; and performing the steps of measuring a performance of the target application, selecting the one configuration cluster, and modifying the IHS using another plurality of configuration clusters.

10. The method of claim 8, further comprising performing a machine learning (ML) process to optimize a performance of the target application by fine tuning one or more of the configuration settings of the selected configuration cluster.

11. The method of claim 10, further comprising:
storing the one or more fine tuned configuration settings as an augmented configuration cluster in the memory, wherein the augmented configuration cluster is associated with the target application and an identified operating mode of the target application so that, when the target application is again started on the IHS at a future time, selecting the augmented configuration cluster from the memory for optimizing the performance of the target application at its current operating mode.

12. The method of claim 8, further comprising selecting the plurality of configuration clusters as a subset of a plurality of available configuration clusters according to at least one of a current performance mode of the IHS or a battery operating mode of the IHS.

13. The method of claim 8, further comprising selecting the plurality of configuration clusters as a subset of a plurality of available configuration clusters according to a type of the target application currently being executed on the IHS.

14. The method of claim 8, wherein the one or more resources comprises at least one of a central processing unit (CPU) resource, a graphics processing unit (GPU) resource, a storage resource, a network resource, and a platform resource.

15. A memory storage device having program instructions stored thereon that, upon execution by one or more processors of an Information Handling System (IHS), cause the IHS to:
identify an operating mode at which a user is using a target application;
select a subset from among a plurality of configuration clusters according to the identified operating mode of the target application;
measure a performance of the target application at each of a plurality of configuration clusters that are applied to an IHS, each configuration cluster comprising a plurality of configuration settings of one or more resources that are used to execute the target application on the IHS;
select one of the configuration clusters that causes the target application to operate at an optimum performance level; and
modify the IHS to operate with the one selected configuration cluster.

16. The memory storage device of claim 15, wherein the instructions are further executed to:
detect that an operating mode of the target application has changed; and
perform the steps of measuring a performance of the target application, selecting the one configuration cluster, and modifying the IHS using another plurality of configuration clusters,
wherein the other plurality of configuration clusters are selected according to the detected operating mode.

17. The memory storage device of claim 15, wherein the instructions are further executed to perform a machine learning (ML) process to optimize a performance of the target application by fine tuning one or more of the configuration settings of the selected configuration cluster.

18. The memory storage device of claim 17, wherein the instructions are further executed to:
store the one or more fine tuned configuration settings as an augmented configuration cluster in the memory, wherein the augmented configuration cluster is associated with the target application and an identified operating mode of the target application so that, when the target application is again started on the IHS at a future time, the instructions are further executed to select the augmented configuration cluster from the memory for optimizing the performance of the target application at its current operating mode.

* * * * *